3,427,717
TREE TRIMMER
Dory J. Neale, Sr., 3710 Shore Acres Blvd.,
St. Petersburg, Fla. 33703
Filed May 1, 1967, Ser. No. 635,076
U.S. Cl. 30—180          10 Claims
Int. Cl. B26b 17/04

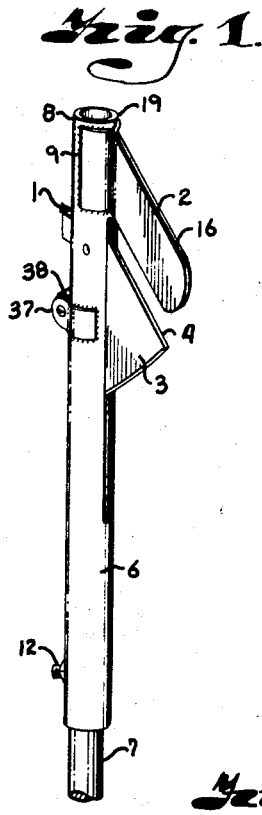
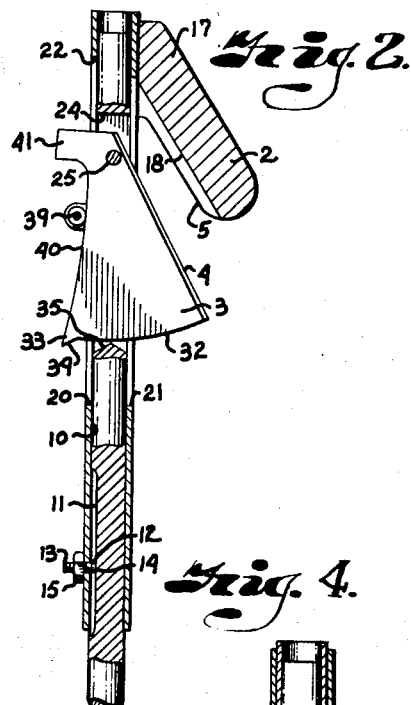
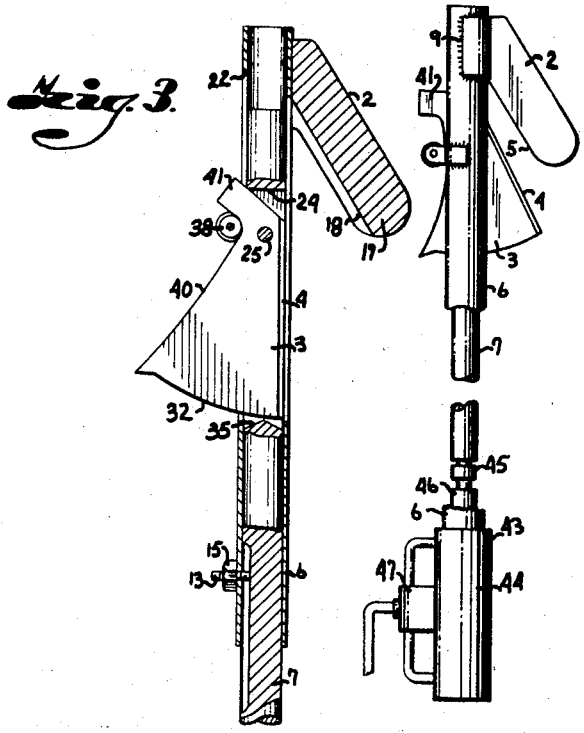
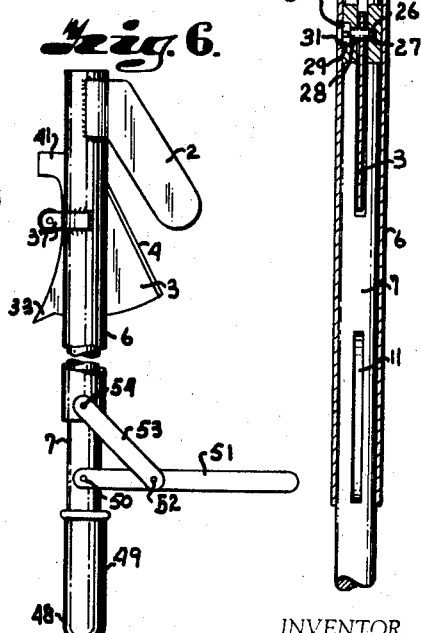
INVENTOR.
DORY J. NEALE, Sr.
BY Fishburn and Gold
ATTORNEYS

United States Patent Office 3,427,717
Patented Feb. 18, 1969

ABSTRACT OF THE DISCLOSURE

A cutting apparatus having longitudinally relatively movably elongate members with blades adjacent one end thereof and operating mechanism adjacent the opposite end for trimming trees and the like whereby the cut may be made at a distance from the operator, one of the blades being fixed on one member and extending outwardly therefrom, the other blade being pivotally mounted on the other member with said one member and said other blade having cooperative cam surfaces for effecting swinging action of said other blade and cooperative cutting movement thereof relative to the first named blade in response to relative longitudinal movement of said elongate members.

---

The principal objects of the present invention are to provide a cutting apparatus such as tree trimmers and the like with the blades and blade operators arranged to provide a relative swinging and linear movement of the blades to impart a slicing action on objects therebetween; to provide an elongate structure with a minimum of laterally extending portions whereby the blades may be moved in close growth and between limbs, branches and the like, for cutting desired limbs; to provide such a structure in the nature of a tree trimmer with two relatively movable longitudinal members with a stationary blade mounted on one and extending outwardly therefrom at an angle and a movable blade pivotally mounted on the other member and swingable and movable toward the stationary blade in response to relative longitudinal movement of said members; to provide such a structure wherein the movable blade and said one elongate member have cam portions to effect swinging of the blade at a desired rate in response to relative longitudinal movement of the elongate members; to provide such a structure with operating members connected to the elongate members at end portions remote from the blades; to provide such a structure wherein one of the members is tubular and the other is reciprocally mounted therein; and to provide a tree trimmer structure that is economical to manufacture, easily manipulated and capable of powerful cutting action.

Other objects and advantages of this invention will become apparent from the following description taken in connection with the accompanying drawings wherein are set forth by way of illustration and example certain embodiments of this invention.

FIG. 1 is a perspective view of the cutting end portion of a cutting apparatus embodying the features of the present invention.

FIG. 2 is a longitudinal sectional view through the cutting apparatus shown in FIG. 1 with a movable blade partially moved toward cutting position.

FIG. 3 is a sectional view through the cutting apparatus, similar to FIG. 2, and with the movable blade in retracted position.

FIG. 4 is a longitudinal sectional view through the cutting apparatus taken on the line 4—4, FIG. 2.

FIG. 5 is an elevational view of the cutting apparatus with a power operator.

FIG. 6 is a side elevational view of the cutting apparatus with a manual operator.

Referring more in detail to the drawings:

The reference numeral 1 generally designates a cutting apparatus wherein a stationary blade 2 and a movable blade 3 are supported and operated whereby the movable blade is provided with a swinging action to move the cutting edge 4 toward the cooperating edge 5 of the stationary blade while moving the movable blade toward the stationary blade to provide a slicing action on objects such as limbs and the like to be cut. While the structure is illustrated as being for a tree trimmer, it is also adapted for other embodiments with various length handles or members and for cutting various objects including bushes, brush and the like.

In the structure illustrated, elongate members 6 and 7 are suitably connected for relatively longitudinal movement with the stationary blade 2 arranged at an end portion 8 of one member and the movable blade 3 is pivotally mounted on the other member, the blade 2 being fixed as at 9 to the member 6. The member 6 is shown as an elongate tubular member and the member 7 is shown as a shaft slideably mounted in the bore 10 of the tubular member 6 with cooperative means holding the tube and shaft against relative rotation. In the structure illustrated, the cooperative means is a groove 11 in the shaft 7 engaged by a key 12 mounted on the tube 6, the structure shown being a threaded shank 13 threaded into a bore 14 of the tubular member and locked by a nut 15. The slot 11 is elongate and so arranged to provide for any necessary relative longitudinal movement of the shaft and tube.

The blade 2 is shown as having edges 5 and is formed by a plurality of laminations with outer layers 16 fixed in face to face relation to an inner lamination 17, said inner lamination having an edge 18 recessed from the edges 5 to form a groove extending longitudinally of the blade for receiving the cutting edge 4 of the movable blade 3. The stationary blade 2 is preferably affixed adjacent the end 19 of the tubular member 6 and extends outwardly at an angle toward the other end of the tube. The angle may vary, and in the illustrated structure, the angle between the edge 5 and the tubular member 6 is approximately 30°.

The movable blade 3 is carried by the shaft 7 and moves through diametrically opposed slots 20 and 21 in said tube which slots extend from a point 22 that is beyond the extremity of movement of the adjacent edge of the movable blade when the cutting edge is engaged with the stationary blade, said slots extending longitudinally toward the other end of the tubular member 6 so as to provide ample length for the movable blade and its longitudinal movement relative thereto. The shaft 7 is slideably mounted in the tubular member 6 and has a longitudinal diametric slot 24 aligned with the slots 20 and 21, the slot 24 being slightly wider than the thickness of the blade 3 whereby the blade is freely movable therethrough. The blade 3 is pivotally mounted on a shank 25 of a pivot screw which has a threaded end 26 threaded into a corresponding bore or socket 27 in the shaft 7 at one side of the slot. The other side of the shaft has a bore 28 and a counterbore 29 for the shank 25 and head 30 of the screw, the counterbore 29 being such that the head is recessed therein, as illustrated in FIG. 4. The tubular member 6 is provided with an opening 31 with which the screw head 30 is registrable in a selected position of the members 6 and 7 whereby the screw and shank may be removed for removal of the blade 3.

The blade 3 has an arcuate end 32, the radial center being the shank 25, said arcuate end terminating in a lug or finger 33 spaced from the cutting edge 4, said lug 33 having a shoulder 34 adapted to engage an inclined shoulder 35 formed at the end of the slot 24 adjacent the arcuate end 32 of the blade. Engagement of the faces or shoulders 34 and 35 limiting the swinging movement of the blade 3 toward the edge 5 of the blade 2. The blade 3 and the elongate member 6 have cooperating cam portions to effect swinging movement of the blade 3 in response to relative reciprocal movement of the elongate members 6 and 7. In the illustrated structure, the tubular member 6 has laterally extending spaced ears 37 with a roller 38 mounted therebetween on a shaft or screw 39 and positioned to engage a cam surface 40 or edge of the blade 3 to the rear thereof or the edge opposed to the cutting edge 4. Also, the blade 3 has a tongue or extension 41 extending from the end adjacent the pivot whereby when the shaft 7 is being retracted to a position as illustrated in FIG. 3, the tongue or extension 41 engages the roller 38 to effect complete retraction or withdrawal of the blade 3 to position the cutting edge 4 thereof inwardly in the tubular member 6.

To apply cutting action to a limb or the like, the apparatus is manipulated into position whereby the stationary blade 2 and tubular member 6 are hooked over the limb at the place to be cut. Then, while holding the tubular member 6 in that position the shaft 7 is moved longitudinally toward the end 19 of the tubular member 6 and the blade 3 being of substantially greater width at its arcuate end remote from the pivot than it is adjacent the pivot, as illustrated in FIGS. 2 and 3, the relative movement of the shaft 7 and blade 4 and the engagement of the cam edge or surface 40 with the roller 38 swinging the cutting blade 3 outwardly through the slot 21 toward the edge 5 of the stationary blade 2. This swinging movement is simultaneous with the longitudinal movement of the blade so as to provide a slicing movement of the blade into the limb while the blade is being drawn through the limb and cutting same. It is preferred that the edge 40 be curved so that the rate of swinging movement relative to the extent of the longitudinal movement varies in the stroke, the swinging movement being greater as the stroke is started and gradually reducing whereby the final cutting action is substantially longitudinal movement of the blade.

The relative movement of the elongate members may be effected by various means, and in the form of the invention illustrated in FIG. 5, the movement is effected by a power ram 43 which has a cylinder 44 suitably secured to the tubular member 6 with the shaft 7 suitably connected as at 45 with the piston rod 46 of the ram. The ram may be actuated from fluid pressure from a suitable source (not shown) under control of a valve 47. The cutting apparatus is particularly adapted for the power operation from a fluid pressure ram due to the absence of levers and other extending members near the blades that could interfere with insertion into closely positioned limbs, growth and the like.

In the form of invention illustrated in FIG. 6, the structure is shown as manually operated, the shaft 7 at the end 48 remote from the cutting blades has a handle 49 and pivotally mounted on the shaft as at 50 is a lever 51 with a portion 52 spaced from the pivot 50 having a pivotal connection with one end of a link 53, the other end of which is pivotally connected as at 54 to the tubular member 6 whereby swinging movement of the lever 51 effects relative reciprocation of the shaft 7 and tubular member 6 to move the movable blade 3 from retracted position to cutting position and return.

It is to be understood that while I have illustrated and described certain forms of my invention it is not to be limited to the specific form or arrangement of parts herein described and shown except insofar as such limitations are included in the claims.

What I claim and desire to secure by Letters Patent is:

1. A cutting apparatus comprising,
   (a) an elongate member,
   (b) a stationary blade fixed to said elongate member and extending at an angle therefrom,
   (c) a movable cutting blade having a sharpened edge adapted to move toward said stationary blade to complete a cut,
   (d) a second elongate member movable longitudinally of the first named elongate member and having cooperative guiding engagement therewith,
   (e) means pivotally mounting an end portion of the movable cutting blade on said second elongate member, said end being the end adjacent the stationary blade whereby the movable blade is swingable toward the stationary blade,
   (f) and cooperative cam means on the first named elongate member and the movable blade for forcing the movable blade toward the stationary blade as the second elongate member is moved longitudinally of said first named elongate member toward said stationary blade.

2. A cutting apparatus as set forth in claim 1 wherein the first named elongated member is tubular and the second elongate member is a shaft sleeved therein with cooperative engaging means on the shaft and tubular member preventing relative rotation thereof.

3. A cutting apparatus as set forth in claim 1 wherein one of the cam means is a roller member mounted on the first named elongate member and the other is a curved edge on the movable blade, said curved edge being spaced from the cutting edge of the movable blade and at an angle thereto, the spacing being progressively greater away from the pivotal mounting of said movable blade.

4. A cutting apparatus as set forth in claim 2 wherein the tubular member and shaft each have elongate slots substantialy coplanar with the stationary blade, said movble blade being mounted in the slot of the shaft and swingable through the slot in the tubular member.

5. A cutting apparatus as set forth in claim 4 wherein the movable blade and shaft have cooperative stop portions limiting swinging movement toward the stationary blade.

6. A cutting apparatus as set forth in claim 5 wherein the movable blade has a tongue engaged by the roller when the shaft is retracted relative to the tubular member to retract the movable blade.

7. A cutting apparatus as set forth in claim 4 wherein one of the cam means is a member mounted on the tubular member and the other is a curved edge on the movable blade spaced from the cutting edge and at an angle thereto, the spacing being progressively greater away from the pivotal mounting of said movable blade.

8. A cutting apparatus as set forth in claim 7 wherein the tubular member and shaft each have elongate slots substantially coplanar with the stationary blade, said movable blade being mounted in the slot of the shaft and swingable through the slot in the tubular member, and the movable blade and shaft have cooperative stop portions limiting swinging movement toward the stationary blade.

9. A cutting apparatus as set forth in claim 1 wherein a fluid operated ram structure has a cylinder and piston with said one elongate member being connected relative to a cylinder of said fluid ram and the other elongate member is connected to the other elongate member whereby reciprocation of said members actuate the movable blade to cut objects between said movable blade and stationary blade.

10. A cutting apparatus as set forth in claim 1 wherein a handle has one portion pivotally mounted on said other elongate member, and a link connecting said lever to the first named elongate member whereby movement of said lever effects relative longitudinal movement of said elongate members and cutting action of the blades.

References Cited

UNITED STATES PATENTS

| | | | |
|---|---|---|---|
| 958,587 | 5/1910 | Brooks | 30—246 |
| 2,006,941 | 7/1935 | Broemme | 30—237 |
| 2,246,730 | 6/1941 | Hafdell | 30—237 |
| 2,504,405 | 4/1950 | Fletcher | 30—249 |

ROBERT C. RIORDON, *Primary Examiner.*

J. C. PETERS, *Assistant Examiner.*

U.S. Cl. X.R.

30—181